United States Patent
Peng et al.

(10) Patent No.: US 7,864,522 B1
(45) Date of Patent: Jan. 4, 2011

(54) HARD DISK DRIVE HOLDER

(75) Inventors: Wen-Tang Peng, Taipei Hsien (TW); Zhe Zhang, Shenzhen (CN); Tie-Shan Jiang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/613,449

(22) Filed: Nov. 5, 2009

(51) Int. Cl.
*H05K 7/00* (2006.01)
*A47B 81/00* (2006.01)
*H01R 11/20* (2006.01)
*G11B 33/02* (2006.01)
*G06F 1/16* (2006.01)

(52) U.S. Cl. ............... 361/679.33; 312/223.2; 312/332.1; 439/327; 439/328; 369/77.11; 369/77.21; 361/679.37; 361/679.39; 361/679.58

(58) Field of Classification Search ............... 361/679.31–679.45, 679.55–679.61, 724–727; 312/223.1, 223.2; 439/357, 358, 488–491, 439/60, 151–160, 327–328, 331; 165/104.33; 369/75.11, 75.21, 76, 77.21, 78, 79, 80, 81, 369/82
See application file for complete search history.

(56) References Cited

U.S. PATENT DOCUMENTS

| | | | | |
|---|---|---|---|---|
| 6,359,778 | B1 * | 3/2002 | Wu | 361/679.33 |
| 6,490,153 | B1 * | 12/2002 | Casebolt et al. | 361/679.33 |
| 6,798,650 | B2 * | 9/2004 | Reznikov et al. | 361/679.33 |
| 7,110,250 | B2 * | 9/2006 | Lee | 361/679.32 |
| 7,423,869 | B2 * | 9/2008 | Su | 361/679.33 |
| 7,480,137 | B1 * | 1/2009 | Jyh | 361/679.33 |
| D588,132 | S * | 3/2009 | Lauffer et al. | D14/432 |
| 2007/0211422 | A1 * | 9/2007 | Liu et al. | 361/685 |
| 2008/0204994 | A1 * | 8/2008 | Wang | 361/685 |
| 2008/0266781 | A1 * | 10/2008 | Olesiewicz et al. | 361/685 |

* cited by examiner

*Primary Examiner*—Zachary M Pape
*Assistant Examiner*—Jerry Wu
(74) *Attorney, Agent, or Firm*—Zhigang Ma

(57) ABSTRACT

A hard disk drive holder includes a main body, a spindle mounted to the main body and slidable between first and second positions, a handle rotatably connected to the main body via the spindle, a hook mounted to the handle, and first and second elastic members. The handle includes a locking tongue. The handle moves between closed and opened positions relative to the main body. When the handle is at the closed position, if the spindle is slid from the first position to the second position, the locking tongue gradually extends outside from the main body. When the handle is at the closed position, if the spindle is not at the first position, the hook can hook the main body. The first elastic member biases the spindle to slide to the second position. The second elastic member biases the handle to rotate to the opened position.

20 Claims, 5 Drawing Sheets

HARD DISK DRIVE HOLDER

BACKGROUND

1. Technical Field

The present disclosure relates to a hard disk drive (HDD) holder.

2. Description of Related Art

An HDD holder is used to hold an HDD. The HDD holder typically includes a main body and a handle having opposite first and second ends, wherein the first end is rotatably mounted to the main body, a locking tongue extends from the first end, and a hook extends from the second end. A computer chassis typically includes a receiving portion for receiving the HDD holder. The receiving portion includes opposite sidewalls for mounting the HDD holder therebetween, wherein one of the sidewalls defines a locking hole. When the HDD holder is received in the receiving portion, the handle is rotated to the main body to be closed. The hook of the handle will hook the main body of the HDD holder, and the locking tongue will extend in the locking hole of the receiving portion. Therefore, the HDD holder can be securely locked in the receiving portion successfully. However, when the receiving portion is manufactured, there is usually an error of a distance between the sidewalls of the receiving portion, which may lead the locking tongue of the handle cannot be locked in the locking hole of the receiving portion.

In order to solve the above-mentioned problem, a new frame appears in industry to improve the HDD holder. In the new frame, the locking tongue is elastically mounted to the first end of the handle, and thereby the distance error of the sidewalls of the receiving portion can be offset. However, this new frame causes a new problem that the hook of the handle can hook the main body of the HDD holder no matter the locking tongue extends in the locking hole or abuts against the corresponding sidewall of the receiving portion. In other words, when the HDD holder is received in the receiving portion, if the HDD holder is not located at the right position to be locked, the handle can still be closed, which will misguide a user to think that the installation of the HDD holder has already been done. Under this misguided thought, when the user operates or turns the receiving portion, the HDD may fall off the receiving portion and the HDD may be damaged.

DETAILED DESCRIPTION

Figure 1:
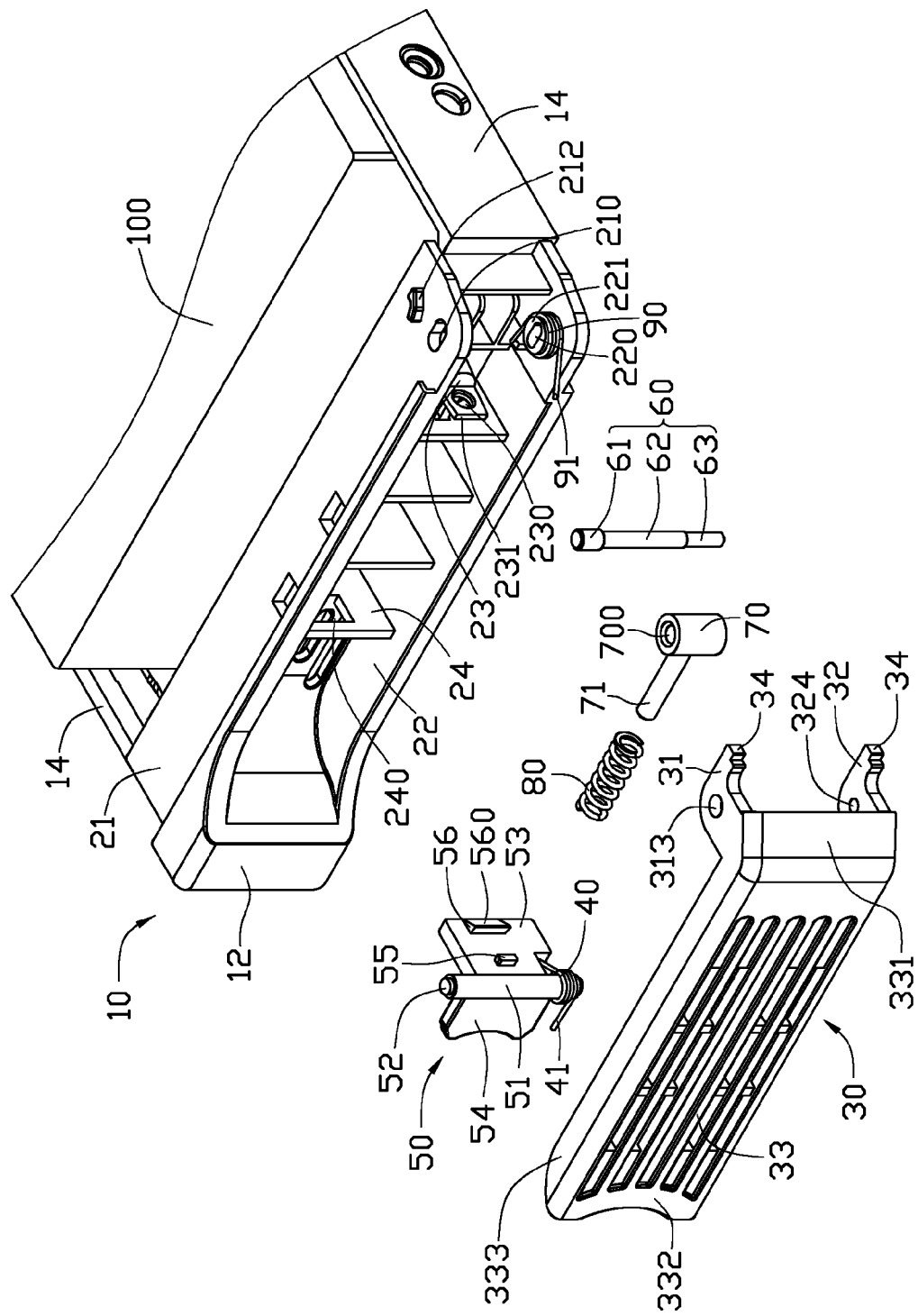
FIG. 1 is an exploded, isometric view of an embodiment of a hard disk drive (HDD) holder together with an HDD.
Figure 2:
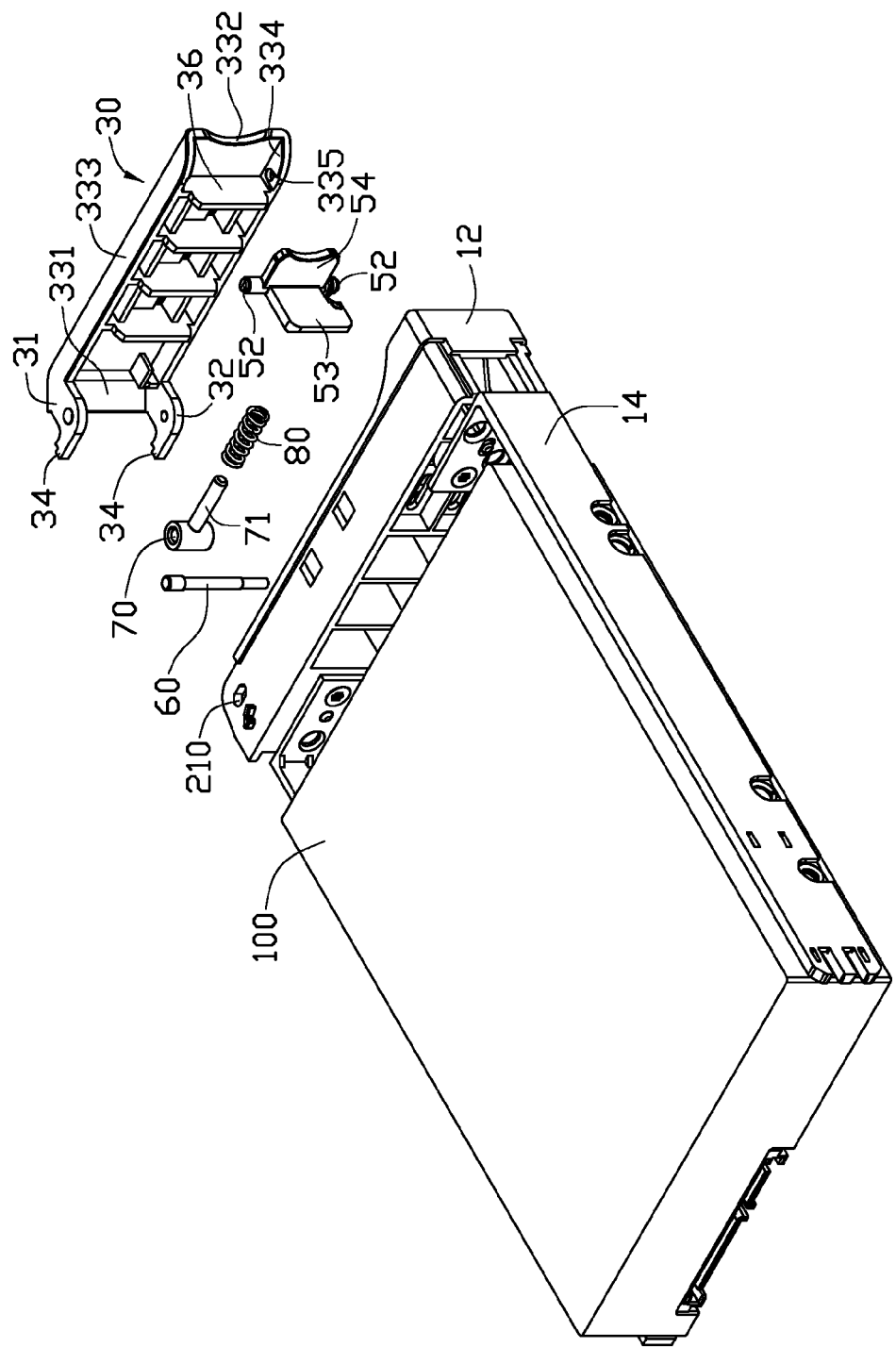
FIG. 2 is similar to FIG. 1, but viewed from another perspective.
Figure 3:
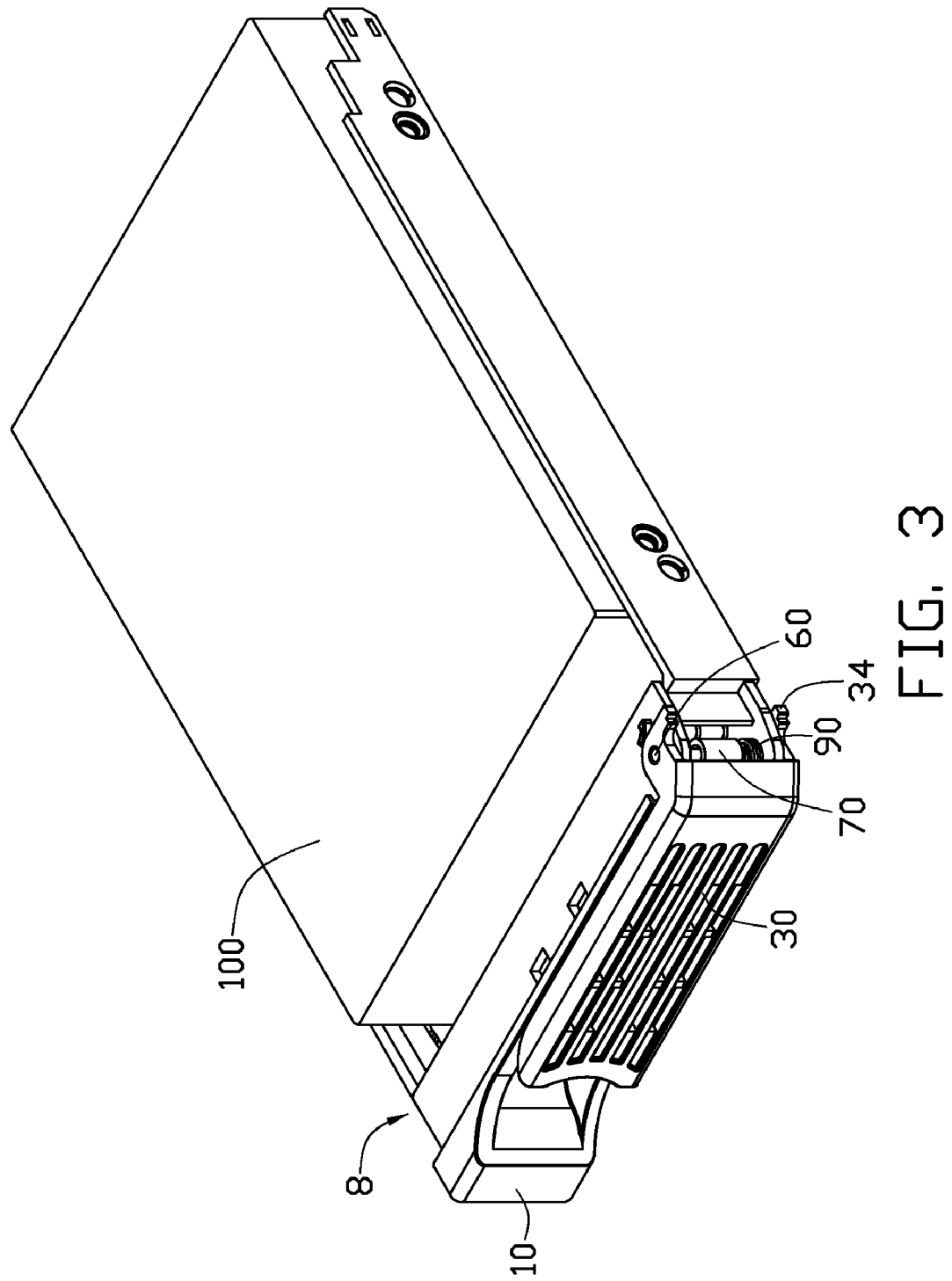
FIG. 3 is an assembled view of the HDD holder and the HDD of FIG. 1.

Referring to FIGS. 1 to 3, an embodiment of a hard disk drive (HDD) holder 8 includes a main body 10, a spindle 60, a sleeve 70, a first elastic member 80, a second elastic member 90, a handle 30, a hook 50, and a third elastic member 40.

The main body 10 includes an elongated panel 12, and two arms 14 extending backward from opposite left and right ends of the panel 12. The arms 14 are configured to fix an HDD 100 therebetween. The panel 12 includes an elongated top board 21, an elongated bottom board 22, a first connecting wall 23 (also shown in FIG. 4), and a second connecting wall 24. The top board 21 and the bottom board 22 are opposite to each other. The first connecting wall 23 and the second connecting wall 24 are perpendicularly connected between the top board 21 and the bottom board 22. The first connecting wall 23 is located between the right end of the panel 12 and the second connecting wall 24. The second connecting wall 24 is located between the left end of the panel 12 and the first connecting wall 23.

The top board 21 defines a first elongated hole 210 adjacent to a right end of the top board 21, extending through the top board 21. A longitudinal axis of the first elongated hole 210 is parallel with a longitudinal axis of the top board 21. A projection 212 extends from the top board 21, adjacent to the right end of the top board 21. The projection 212 is located between the first elongated hole 210 and the arm 14 at the right end of the top board 21.

A round raised portion 221 extends from the bottom board 22 towards the top board 21, below the first elongated hole 210 of the top board 21. A second elongated hole 220 is axially defined in the raised portion 221 and extends through the bottom board 22. A longitudinal axis of the second elongated hole 220 is parallel with a longitudinal axis of the bottom board 22. The second elongated hole 220 aligns with the first elongated hole 210.

A projecting piece 231 extends from the first connecting wall 23, opposite to the second connecting wall 24. A guiding hole 230 is defined in the projecting piece 231.

A hooking hole 240 is defined in the second connecting wall 24

The spindle 60 is cylindrical and includes three coaxial segments. It includes a first segment 61, a second segment 62, and a third segment 63, wherein the second segment 62 is connected between the first segment 61 and the third segment 63, the diameter of the first segment 61 is the greatest, and the diameter of the third segment 63 is the smallest.

The sleeve 70 axially defines a sleeve hole 700 corresponding to the second segment 62 of the spindle 60. A guiding post 71 extends from a circumference of the sleeve 70, perpendicular to the extending direction of the sleeve hole 700.

In the present embodiment, the first elastic member 80 is a pressure spring.

In the present embodiment, the second elastic member 90 is a torsion spring.

The handle 30 includes a covering board 33. An upper bending piece 333 extends perpendicularly from a top side of the covering board 33. A lower bending piece 334 extends perpendicularly from a bottom side of the covering board 33 and is opposite to the upper bending piece 333. The covering board 33 includes opposite right end 331 and left end 332. A first extension piece 31 extends from the upper bending piece 333, adjacent to the right end 331 of the covering board 33. A round first pivot hole 313 is defined in the first extension piece 31 corresponding to the first segment 61 of the spindle 60. A second extension piece 32 extends from the lower bending piece 334, adjacent to the right end 331 of the covering board 33 and is opposite to the first extension piece 31. A round second pivot hole 324 is defined in the second extension piece 32, corresponding to the third segment 63 of the spindle 60. A locking tongue 34 extends from each of the first extension piece 31 and the second extension piece 32, towards a direction opposite to the left end 332 of the covering board 33. A round third pivot hole 335 (see FIG. 2) is defined in each of the upper bending piece 333 and the lower bending piece 334, adjacent to the left end 332 of the covering board 33. A blocking piece 36 is perpendicularly connected between the upper bending piece 333 and the lower bending piece 334, adjacent to the third pivot holes 335. The blocking piece 36 is located between the third pivoting hole 335 and the right end 331 of the covering board 33.

The hook 50 includes a post 51. A pivoting pole 52 extends from each of top and bottom ends of the post 51. A hooking portion 53 and an operating portion 54 extend from a circumference of the post 51. An extending direction of the operating portion 54 is perpendicular to an extending direction of the hooking portion 53. A hooking block 56 and a projection 55 extend from the hooking portion 53, opposite to the operating portion 54. The projection 55 is located between the hooking block 56 and the post 51. The hooking block 56 includes a slanting guiding surface 560.

In the present embodiment, the third elastic member 40 is a torsion spring.

In assembling the HDD holder 8, the second elastic member 90 is fitted around the raised portion 221 of the main body 10. The first elastic member 80 is fitted around the guiding post 71 of the sleeve 70. The sleeve 70 is disposed between the raised portion 221 of the main body 10 and the top board 21, and a free end of the guiding post 71 is extended through the guiding hole 230 of the projecting piece 231, to sandwich the first elastic member 80 between the projecting piece 231 and the sleeve 70. The first extension piece 31 of the handle 30 is disposed on the top board 21 of the main body 10, with the first pivot hole 313 of the handle 30 aligning with the first elongated hole 210, and the second extension piece 32 of the handle 30 is disposed under the bottom board 22 of the main body 10, with the second pivot hole 324 of the handle 30 aligning with the second elongated hole 220. The first pivot hole 313 and the second pivot hole 324 of the handle 30, the first elongated hole 210 and the second elongated hole 220 of the main body 10, and the sleeve hole 700 of the sleeve 70 are adjusted to be aligned, and cooperatively receive the spindle 60. It is noted that the first segment 61 of the spindle 60 is received in the first pivot hole 313 of the handle 30 and the first elongated hole 210 of the main body 10, and an engagement between the first segment 61 and the first pivot hole 313 and an engagement between the first segment 61 and the first elongated hole 210 are clearance fit; the second segment 62 of the spindle 60 is received in the sleeve hole 700 of the sleeve 70, and an engagement between the second segment 62 and the sleeve hole 700 is interference fit; the third segment 63 of the spindle 60 is received in the second elongated hole 220 of the main body 10 and the second pivot hole 324 of the handle 30, and an engagement between the third segment 63 and the second elongated hole 220 and an engagement between the third segment 63 and the second pivot hole 324 are clearance fit. The third elastic member 40 is fitted about the post 51 of the hook 50, adjacent to the bottom end of the post 51. The pivoting poles 52 of the hook 50 are pivotably received in the corresponding third pivot holes 335 of the handle 30, and the projection 55 of the hook 50 abuts against the blocking piece 36 of the handle 30, under the elastic force of the third elastic member 40. It is noted that opposite ends of the first elastic member 80 abut against the projecting piece 231 of the main body 10 and the sleeve 70 respectively, two spring legs of the second elastic member 90 abut against the main body 10 and the handle 30 respectively, and two spring legs of the third elastic member 40 abut against the hooking portion 53 of the hook 50 and the handle 30 respectively and supply the elastic force of the third elastic member 40 to bias the hooking portion 53 to rotate towards the blocking piece 36 of the handle 30. The blocking piece 36 of the handle 30 is configured to prevent the hooking portion 53 from rotating too much.

Figure 4:
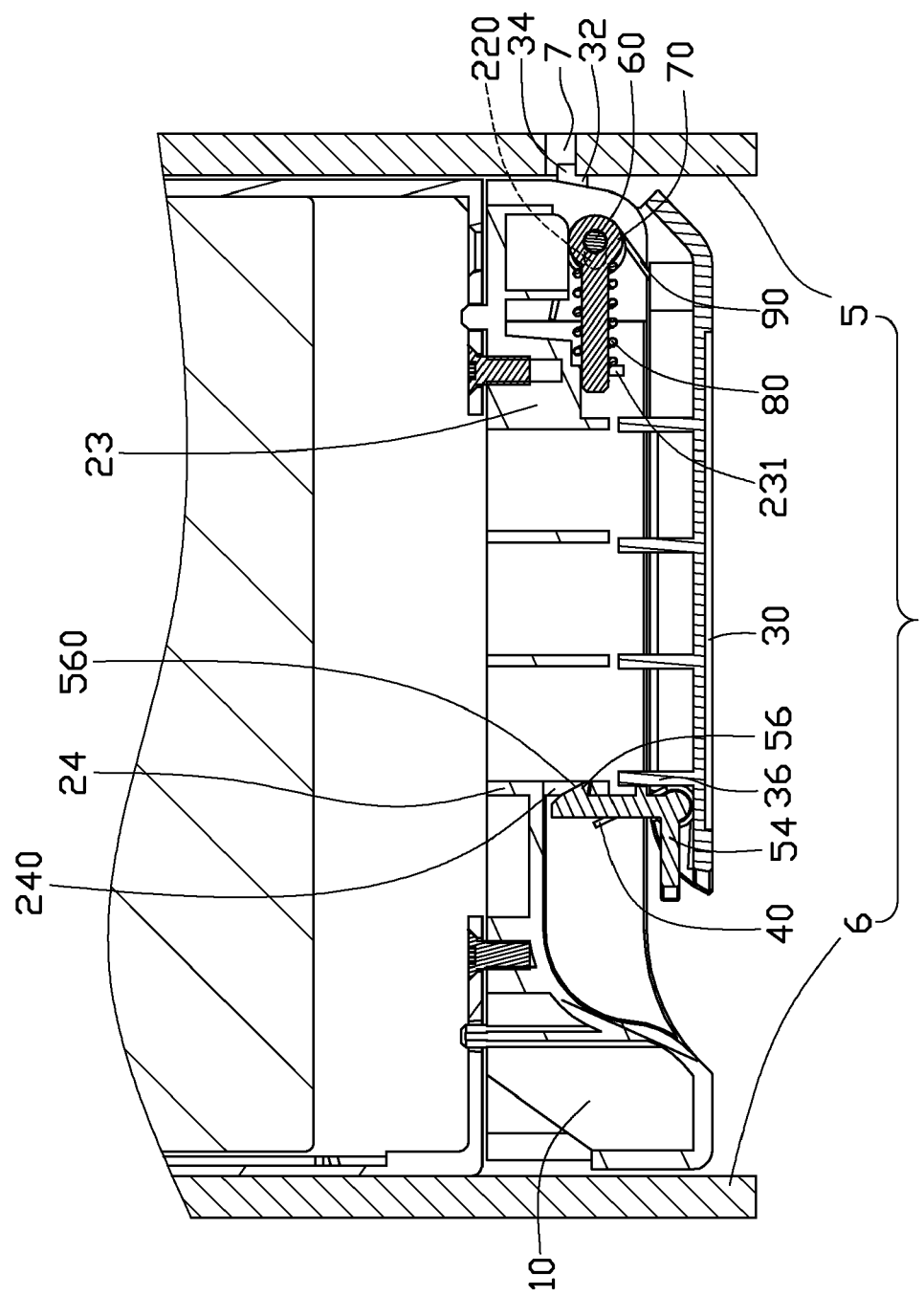
FIG. 4 is a cross-sectional view of the assembly of the HDD holder and the HDD of FIG. 3 received in a receiving portion, showing the assembly at a locking position.

Referring to FIG. 4, in normal use of the HDD holder 8, the handle 30 is opened relative to the main body 10 via rotating around the spindle 60 (FIG. 4 shows the handle being closed). The HDD holder 8 is slid into a receiving portion 4 of a computer chassis, to completely receive the HDD holder 8 in the receiving portion 4. The handle 30 is rotated to the main body 10 to be closed. When the handle 30 is rotated to the main body 10, the guiding surface 560 of the hooking block 56 of the hook 50 contacts a corresponding end of the second connecting wall 24 of the main body 10, and under the elastic force of the third elastic member 40, the hooking block 56 goes over the corresponding end of the second connecting wall 24 via an engagement between the guiding surface 560 and the corresponding end of the second connecting wall 24, to extend in the hooking hole 240 of the second connecting wall 24 to hook the second connecting wall 24. The locking tongues 34 of the handle 30 extend into a locking hole 7 of a first sidewall 5 of the receiving portion 4, the first extension piece 31 and the second extension piece 32 of the handle 30 abut against an inner side of the first sidewall 5, and the second elastic member 90 is elastically deformed. Therefore, the HDD holder 8 is locked between the first sidewall 5 and a second sidewall 6 opposite to the first sidewall 5 of the receiving portion 4. It is noted that the first elastic member 80 supplies an elastic force to bias the sleeve 70 together with the spindle 60 and the handle 30 to right dead ends of the first elongated hole 210 and the second elongated hole 220.

In uninstalling the HDD holder 8, the operating portion 54 of the hook 50 is pressed towards the left end 332 of the handle 30 to disengage the hooking block 56 of the hook 50 from the hooking hole 240 of the main body 10. Therefore, an elastic force of the second elastic member 90 can bias the handle 30 to rotate away from the main body 10 and thereby opening the handle 30. The locking tongues 34 of the handle 30 disengage from the locking hole 7 of the first sidewall 5 of the receiving portion 4. Therefore, the HDD holder 8 is ready to be removed from the receiving portion 4. It is noted that the projection 212 of the top board 21 of the main body 10 is configured to limit a rotation angle of the handle 30. When the handle 30 is opened, the first extension piece 31 will be blocked by the projection 212, such that the rotation angle of the handle 30 is limited between about 0-30 degrees.

In practice, a distance between the first and second sidewalls 5 and 6 of the receiving portion 4 usually has an error between plus or minus 1 millimeter (the error range is much less than lengths of the first elongated hole 210 and the second elongated hole 220). The handle 30 of the present disclosure is able to slide under the force of the first elastic member 80, such that the locking tongues 34 of the handle 30 is able to elastically engage in the locking hole 7 of the receiving portion 4 no matter how much distance between the first and second sidewalls 5 and 6 of the receiving portion 4. Therefore, the error of the distance can be offset.

Figure 5:
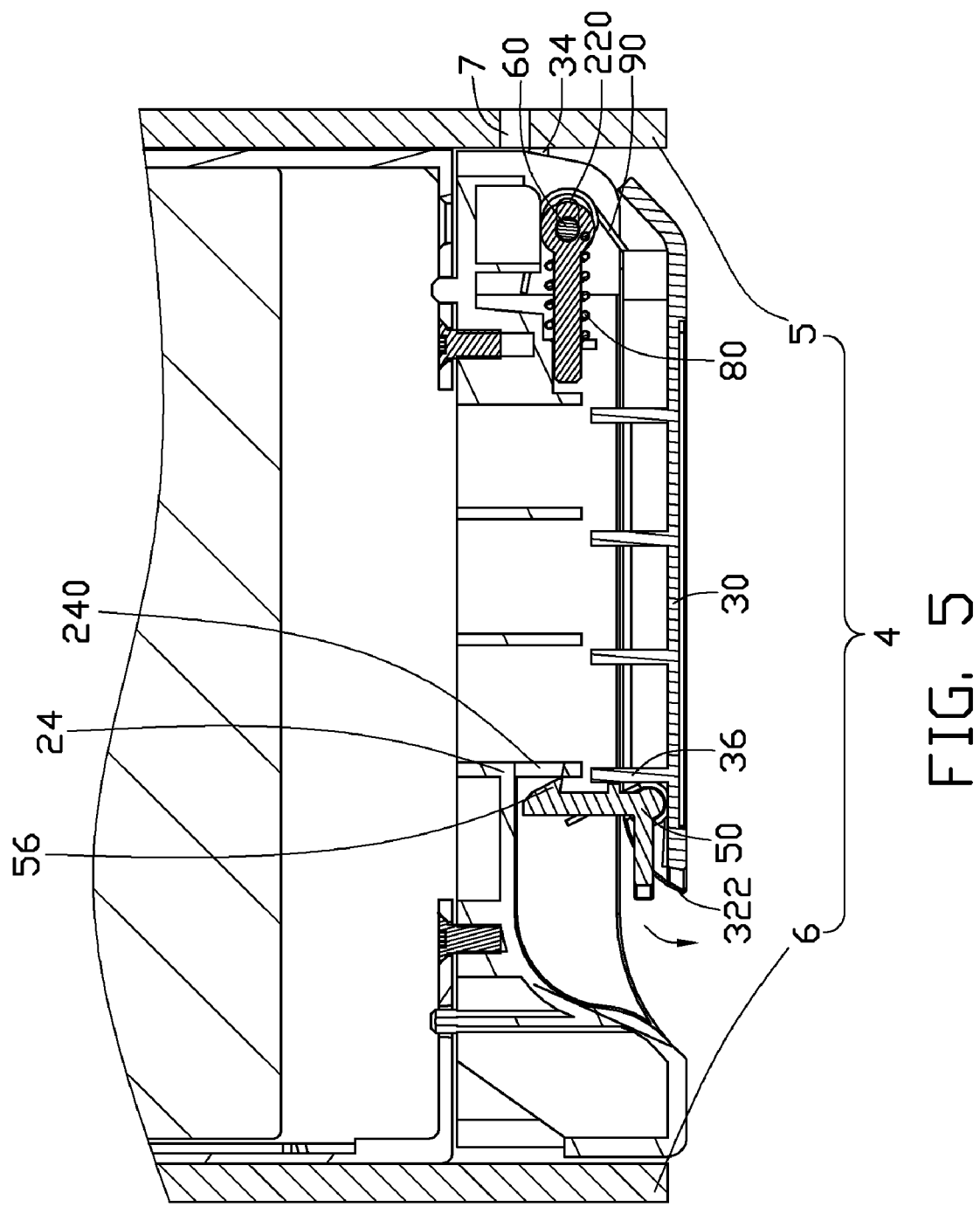
FIG. 5 is similar to FIG. 4, but showing the assembly not at the locking position.

Referring to FIG. 5, the present disclosure has an innovative function that if the HDD holder 8 is not completely slid in the receiving portion 4, the handle 30 can not be closed, which is actually an alarm and can lead the user to assuredly push the HDD holder 8 in position to be locked. In detail, when the HDD holder 8 is not completely slid in the receiving portion 4, if the handle 30 is tried to be closed by the user, the locking tongues 34 of the handle 30 will engage with the first sidewall 5 of the receiving portion 4 and be compelled to move leftward. The handle 30 together with the hook 50 will slide leftward under the guiding of the first elongated hole 210 and the second elongated hole 220, wherein the spindle 60 is slid to left dead ends of the first elongated hole 210 and the second elongated hole 220. Therefore, the hooking block 56 of the hook 50 will be completely located at the left side of second connecting wall 24 of the main body 10 and cannot engage in the hooking hole 240 of the second connecting wall 24. Once the operation of the user stops, the handle 30 will be rotated away from the main body 10 by the second elastic member 90 to be opened. Accordingly, the present disclosure can prevent the user from making mistakes and thereby preventing the HDD holder 8 from been damaged by accident.

In other embodiments, the engagement between the spindle 60 and the sleeve 70 may be clearance fit, and the engagement(s) between the spindle 60 and the first pivot hole 313 and/or the second pivot hole 324 of the handle 30 may be interference fit.

In other embodiments, the first elastic member 80 may be a torsion spring whose two spring legs abut against the main body 10 and the sleeve 70, respectively. Another round raised portion like the raised portion 221 may extend from the main body 10 for the torsion spring to fit about.

In other embodiments, the sleeve 70 may be omitted, and the guiding post 71 may extend from the spindle 60. Furthermore, the guiding post 71 may be omitted, and a first portion of the spindle 60 that engages in the first elongated hole 210 and/or a second portion of the spindle 60 that engages in the second elongated hole 220 may be designed to have rectangular cross section to make the spindle 60 be slidable and not pivotable. If the guiding post 71 is omitted, the first elastic member 80 may be positioned in other ways. For example, a sleeve defining a through hole may be disposed, and the first elastic member 80 is received in the through hole with the opposite ends of the first elastic member 80 extending out of the through hole.

In other embodiments, the second elastic member 90 may be a pressure spring whose opposite ends abut against the main body 10 and the handle 30 respectively.

In other embodiments, the third elastic member 40 may be a pressure spring whose opposite ends abut against the operating portion 54 of the hook 50 and the handle 30, respectively. The third elastic member 40 may also be an extension spring whose opposite ends connect with the hooking portion 53 of the hook 50 and the handle 30, respectively.

In other embodiments, one of the locking tongues 34 of the handle 30 may be omitted.

In other embodiments, the hook 50 may be unrotatably fixed to the handle 30 and thereby omitting the third elastic member 40. When the handle 30 needs to be closed, the handle 30 is rotated towards the main body 30, and the guiding surface 560 of the hooking block 56 of the hook 50 engages with the corresponding end of the second connecting wall 24 of the main body 10, to guide the handle 30 to slide leftward, therefore, the hooking block 56 can go over the corresponding end of the second connecting wall 24 to engage in the hooking hole 240. Furthermore, the handle 30 can also be manually slid leftward, and thereby the guiding surface 560 may be omitted.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hard disk drive holder for a hard disk drive, the hard disk drive holder comprising:
   a main body to mount the hard disk drive;
   a spindle slidably mounted to the main body and slidable between a first position and a second position;
   a handle rotatably connected to the main body via the spindle, wherein the handle comprises a covering board, and a locking tongue extending from the covering board, the handle moves between a closed position where the covering board covers the main body, and an opened position where the covering board is away from the main body, wherein when the handle is at the closed position, if the spindle is slid from the first position to the second position, the locking tongue gradually extends outside from a side of the main body;
   a hook mounted to the handle, wherein when the handle is at the closed position, if the spindle is not at the first position, the hook hooks the main body;
   a first elastic member to bias the spindle to tend to slide to the second position; and
   a second elastic member to bias the handle to tend to rotate to the opened position.

2. The hard disk drive holder of claim 1, wherein the main body comprises opposite top and bottom boards, a first elongated hole is defined in the top board, a second elongated hole is defined in the bottom board, and a longitudinal axis of the second elongated hole is parallel with a longitudinal axis of the first elongated hole, the spindle is slidably engaged in the first elongated hole and the second elongated hole along the longitudinal axes of the first and second elongated holes so as to slide between the first position and the second position.

3. The hard disk drive holder of claim 2, wherein a first extension piece and a second extension piece, the first extension piece and the second extension piece extend from opposite sides of the handle, a round first pivot hole is defined in the first extension piece, a round second pivot hole is defined in the second extension piece, the spindle extends in the first pivot hole and the second pivot hole so as to rotatably connect the handle to the main body.

4. The hard disk drive holder of claim 1, wherein the first elastic member is a pressure spring.

5. The hard disk drive holder of claim 4, further comprising a sleeve fitting about the spindle, wherein a guiding hole is defined in the main body, a guiding post extends from the sleeve to enter into the guiding hole, the first elastic member is fitted about the guiding post, and opposite ends of the first elastic member abut against the main body and the sleeve, respectively, so as to bias the spindle.

6. The hard disk drive holder of claim 1, wherein the second elastic member is a torsion spring whose two spring legs abut against the main body and the handle, respectively, so as to bias the handle.

7. The hard disk drive holder of claim 6, wherein a raised portion extends from the main body, and the second elastic member is fitted about the raised portion.

8. The hard disk drive holder of claim 1, further comprising a third elastic member, wherein the hook is rotatably mounted to the handle, the third elastic member acts on the hook, wherein when the handle is at the closed position, the third elastic member biases the hook to rotate to hook the main body.

9. The hard disk drive holder of claim 8, wherein the hook comprises a post pivotably mounted to the handle, and a hooking portion extending from a circumference of the post, a hooking block extends from the hooking portion, a connecting wall extends from the main body, a hooking hole is defined in the connecting wall, the hooking block is operable to extend in the hooking hole so as to hook the hook to the main body.

10. The hard disk drive holder of claim 9, wherein a blocking piece extends from the handle to limit the rotation range of the hook, the third elastic member biases the hooking portion of the hook to abut against the blocking piece, wherein when the hook hooks the main body, the hooking portion abuts against the blocking piece, and when the handle is at the opened position, the hooking portion also abuts against the blocking piece in a same manner.

11. The hard disk drive holder of claim 10, wherein the hook further comprises an operating portion extending from the circumference of the post away from the blocking piece of the main body, the operating portion is able to be operated to rotate the hooking portion of the hook away from the blocking piece.

12. The hard disk drive holder of claim 10, wherein the hooking block of the hook comprises a slanting guiding surface, wherein when the handle is rotated to the closed position, the guiding surface is able to engage with and go over a corresponding end of the connecting wall of the main body to extend in the hooking hole of the connecting wall.

13. The hard disk drive holder of claim 10, wherein the third elastic member is torsion spring whose two spring legs abut against the main body and the hooking portion of the hook, respectively, so as to bias the hook.

14. A hard disk drive holder comprising:
a main body comprising an elongated panel, and two arms extending backward from opposite left and right ends of the panel;
a spindle slidably mounted to a front of the right end of the panel, wherein the spindle is slidable along a longwise direction of the panel between a first position and a second position;
a handle comprising opposite right and left ends, the right end of the handle is rotatably connected to the right end of the panel via the spindle, wherein a locking tongue extends from the right end of the handle away from the left end of the handle, the handle moves between a closed position where the handle covers the main body, and an opened position where the left end of the handle is away from the main body;
a hook mounted to the left end of the handle, wherein when the handle is at the closed position, if the spindle is not at the first position, the hook is able to hook the main body;
a first elastic member to bias the spindle to tend to slide to the second position; and
a second elastic member to bias the handle to tend to rotate to the opened position.

15. The hard disk drive holder of claim 14, wherein the panel comprises opposite top and bottom boards, a first elongated hole is defined in the top board, a second elongated hole is defined in the bottom board, and longitudinal axes of the first and second elongated holes are parallel with the longwise direction of the panel, the spindle is engaged in the first elongated hole and the second elongated hole and is slidable along the longitudinal axes of the first and second elongated holes so as to slide between the first position and the second position.

16. The hard disk drive holder of claim 15, wherein a first extension piece and a second extension piece, the first extension piece and the second extension piece extend from opposite sides of the handle, a round first pivot hole is defined in the first extension piece, a round second pivot hole is defined in the second extension piece, the spindle extends in the first pivot hole and the second pivot hole so as to rotatably connect the handle to the main body.

17. The hard disk drive holder of claim 14, further comprising a third elastic member, wherein the hook is rotatably mounted to the handle, the third elastic member acts on the hook, wherein when the handle is at the closed position, the third elastic member biases the hook to rotate to hook the main body.

18. The hard disk drive holder of claim 17, wherein the hook comprises a post pivotably mounted to the handle, and a hooking portion extending from a circumference of the post, a hooking block extends from the hooking portion, a connecting wall extends from the main body, a hooking hole is defined in the connecting wall, the hooking block is able to extend in the hooking hole so as to hook the hook to the main body.

19. The hard disk drive holder of claim 18, wherein a blocking piece extends from the handle to limit a rotation range of the hook, the third elastic member biases the hooking portion of the hook to abut against the blocking piece, wherein when the hook hooks the main body, the hooking portion abuts against the blocking piece, and when the handle is at the opened position, the hooking portion also abuts against the blocking piece.

20. The hard disk drive holder of claim 19, wherein the hook further comprises an operating portion extending from the circumference of the post away from the blocking piece of the main body, the operating portion is able to be operated to rotate the hooking portion of the hook away from the blocking piece.

* * * * *